(12) United States Patent
Akai et al.

(10) Patent No.: US 8,439,437 B2
(45) Date of Patent: May 14, 2013

(54) SEAT WITH HEATING DEVICE

(75) Inventors: Naruaki Akai, Kadoma (JP); Norio Abe, Kadoma (JP); Naohito Asami, Kadoma (JP); Kazuaki Hioki, Kadoma (JP); Koji Yoshimoto, Kadoma (JP); Kazumi Nagayama, Kadoma (JP); Yoshimitsu Fujiwara, Kadoma (JP); Satoshi Arima, Kadoma (JP); Hideaki Konishi, Kadoma (JP); Hiroyuki Ogino, Kadoma (JP); Ryuta Kondou, Kadoma (JP)

(73) Assignee: Panasonic Corporation, Osaka (JP)

( * ) Notice: Subject to any disclaimer, the term of this patent is extended or adjusted under 35 U.S.C. 154(b) by 337 days.

(21) Appl. No.: 12/809,328

(22) PCT Filed: Dec. 12, 2008

(86) PCT No.: PCT/JP2008/003755
§ 371 (c)(1),
(2), (4) Date: Jun. 18, 2010

(87) PCT Pub. No.: WO2009/081537
PCT Pub. Date: Jul. 2, 2009

(65) Prior Publication Data
US 2011/0163576 A1    Jul. 7, 2011

(30) Foreign Application Priority Data

Dec. 20, 2007  (JP) .................................. 2007-328358
Dec. 27, 2007  (JP) .................................. 2007-336252

(51) Int. Cl.
*A47C 7/74*    (2006.01)

(52) U.S. Cl.
USPC ............... 297/180.12; 297/180.1; 297/180.11

(58) Field of Classification Search ............... 297/180.1, 297/180.11, 180.12
See application file for complete search history.

(56) References Cited

U.S. PATENT DOCUMENTS 6,079,781 A *  6/2000  Tilley ..................... 297/180.1 X
6,792,671 B1 *  9/2004  Oberg .................. 297/180.12 X (Continued)

FOREIGN PATENT DOCUMENTS

JP    55-160522 A    12/1980
JP    62-134454 U     8/1987

(Continued)

OTHER PUBLICATIONS

International Search Report for International Application No. PCT/JP2008/003755, dated Mar. 24, 2009, 3 pages.

*Primary Examiner* — Rodney B White
(74) *Attorney, Agent, or Firm* — Brinks Hofer Gilson & Lione

(57) ABSTRACT

A seat with a heating device is provided which realizes a configuration in which the arm, palms and finger tips of a user can easily be warmed when the user uses the seat with the heating device. When the user is seated in a seat with a heating device and feels cold due to it being winter, the user controls a switch to heat the seat, whereby energization of heating elements 3a, 3b, 3c is started which are connected to a power supply via electric wires. When the energization of the heating elements 3a, 3b, 3c is started, heat generated thereby is conducted to skin materials 2a, 2b, 2c and surfaces of the skin materials are warmed. When the user places his or her arm on an armrest portion 5, the arm is warmed via the skin material 2c, whereby the user can feel the sensation of comfortableness.

11 Claims, 13 Drawing Sheets

U.S. PATENT DOCUMENTS

2006/0158011 A1* 7/2006 Marlovits et al. .......... 297/180.1
2006/0249996 A1* 11/2006 Eberl et al. ............. 297/180.1 X
2007/0158981 A1* 7/2007 Almasi et al. ............ 297/180.12
2008/0012398 A1* 1/2008 Alacqua et al. ........... 297/180.1
2008/0111403 A1* 5/2008 Ulbrich et al. ........... 297/180.12
2010/0327636 A1* 12/2010 Stoll et al. .................. 297/180.1

FOREIGN PATENT DOCUMENTS

JP         04-004850 U     1/1992
JP         09-000389 A     1/1997

* cited by examiner

SEAT WITH HEATING DEVICE

This application is a 371 application of PCT/JP2008/003755 having an international filing date of Dec. 12, 2008, which claims priority to JP2007-328358 filed Dec. 20, 2007 and JP2007-336252 filed Dec. 27, 2007, the entire contents of which are incorporated herein by reference.

TECHNICAL FIELD

The present invention relates to a seat with a heating device for use in airplanes, automobiles and trains.

BACKGROUND ART

In a conventional seat with a heating device, as is shown in FIG. 13, heating elements 14a are installed individually in a seat portion 102 and a backrest portion 103 of a seat 101, so as to allow a user to be seated comfortably in the seat 101 even in a cold season. In addition, there has been a certain type of seat with a heating device in which a heating element 104b is installed even in a side (an inner side 106) of an armrest portion 105 of the seat 101 which faces a user so as to warm a side of the body of the user as well to thereby realize an increase in comfortableness felt by the user (for example, refer to Patent Document 1). Patent Document 1: JP-A-55-160522

Problem that the Invention is to Solve

In the conventional configuration, however, since the portions of the seat where the heating elements are installed are the seat portion, the backrest portion and the inner sides of the armrest portions, the arms of the user are not warmed depending upon positions where the arms are placed, leading to a problem that the user feels cold even though his or her body except the arms are warmed.

In addition, in the conventional configuration, in the case of the armrest portions being of a movable type, although the user can feel that his or her arms are warmed by heating elements installed in top sides of the armrest portions, when the armrest portions are lifted, since no heating element is installed in bottom sides of the armrest portions, the cold sides of the armrest portions which are not heated come to face the arms, shoulders and back of the user, leading to a problem that the user feels uncomfortableness.

The invention has been made with a view to solving the problems inherent in the conventional configurations, and an object thereof is to provide a seat with a heating device which realizes a configuration in which the arms, palms and finger tips of a user can be warmed when the user uses the seat with the heating device.

The invention has been made with view to solving the problems inherent in the conventional configurations, and an object thereof is to provide a seat with a heating device having movable armrest portions which realizes a configuration in which the arms, shoulders and back of a user can be warmed when the user uses the seat with the heating device having movable armrest portions even in such a state that the armrest portions are lifted.

Further, an object of the invention is to provide a seat with a heating device which increases its reliability.

SUMMARY OF THE INVENTION

With a view to solving the problems inherent in the conventional configurations, according to the invention, there is provided a seat with a heating device comprising heating elements which are installed in areas of a top side, a side facing a side of the body of a user, a front end vertical side or another side of an armrest portion which lie over at least one third the armrest portion from a front end thereof. By doing this, the arms, palms and finger tips of the user can easily be warmed by those parts of the body of the user being brought into contact with the portions of the seat with the heating device where the heating elements are installed irrespective of positions where the user places his or her arms and hands or whatever posture the user may take in sitting in the seat with the heating device.

With a view to solving the problem inherent in the conventional configuration, the seat with the heating device of the invention is configured so as to include the heating elements in the bottom sides of the movable armrest portions.

By adopting this configuration, even in the event that the armrest portions are lifted, since the bottom sides in which the heating elements are installed are allowed to face the user, the arms, shoulders and back of the user can be warmed.

In addition, the seat with the heating device of the invention is configured so as to include a switching function to switch the energization of the heating elements depending upon the position of the armrest portions.

By adopting this configuration, when the armrest portions are lowered, the energization can be stopped so as to save electric power from being used wastefully. In addition, in the case of a heating element being installed in the top side of the armrest portion as well, the energization of the heating elements can be switched between the bottom side and the top side depending upon where the armrest portion is positioned, whereby the heating can be implemented so appropriately to match the condition where the user uses the seat with the heating device.

Advantages of the Invention

According to the seat with the heating device of the invention, the arms, palms and finger tips of the user can easily be warmed by those parts of the body of the user being brought into contact with the portions of the seat with the heating device where the heating elements are installed irrespective of positions where the user places his or her arms and hands or whatever posture the user may take in sitting in the seat with the heating device.

According to the seat with the heating device of the invention, even when the armrest portions are lifted, the arms, shoulders and back of the user can easily be brought into contact with the portions of the seat with a heat where the heating elements are installed, whereby those bodily portions of the user can be warmed.

In addition, according to the seat with the heating device of the invention, since the sides of the armrest portion that are to be energized can be switched depending upon where the armrest portion is positioned, whereby the heating can be implemented so appropriately to match the condition where the user uses the seat with the heating device, thereby making it possible to increase the energy saving effect of the seat with the heating device.

Figure 1:
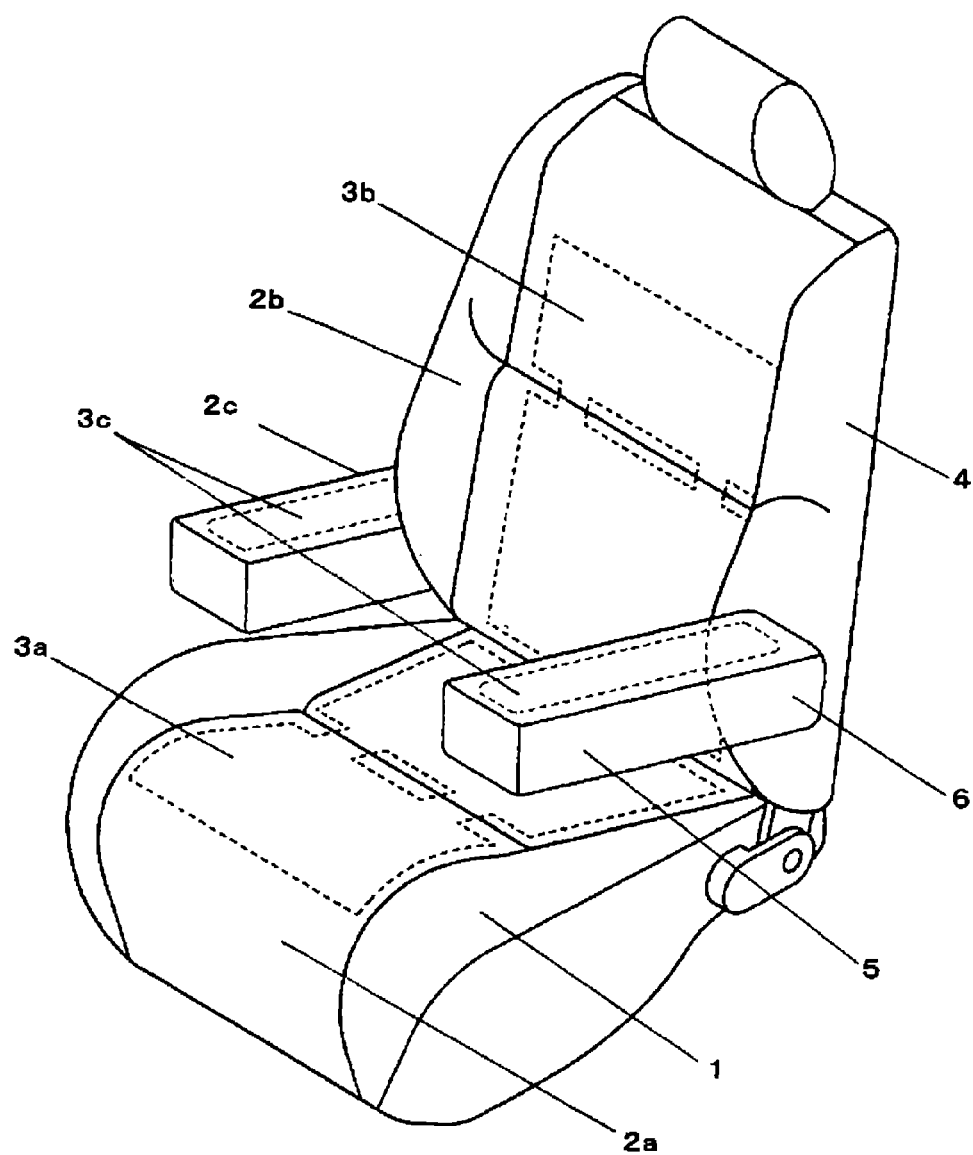
FIG. 1 is a perspective view of a seat with a heating device according to Embodiment 1 of the invention.

DESCRIPTIONS OF REFERENCE NUMERALS 1 seat portion; 3c heating element; 4 backrest portion; 5 armrest portion; 201 seat portion; 202 backrest portion; 203a heating element; 203b heating element; 206 armrest portion; 207b heating element.

DESCRIPTION OF PREFERRED EMBODIMENTS

A first invention provides a seat with a heating device characterized by having an armrest portion and characterized in that the armrest portion includes a heating element in a top side thereof. By this configuration, a bodily portion of the user can be warmed in an ensured fashion by the bodily portion being easily brought into contact with the portion of the armrest portion where the heating element is installed.

A second invention provides a seat with a heating device, characterized in that the heating element is installed within an area which lies one half the top side of the armrest portion from a backrest side thereof. By adopting this configuration, at least a forearm portion of the user is allowed to be brought into contact with the heating element, whereby the advantage of the first invention is increased.

A third invention provides a seat with a heating device, characterized by including a heating element in a side of the armrest portion which faces a side of the body of the user. By adopting this configuration, the advantages of the first and second inventions are increased further.

A fourth invention provides a seat with a heating device, characterized by including a heating element in a front end vertical side of the armrest portion. By adopting this configuration, the palm and finger tip portions of the user can be warmed in an ensured fashion by those bodily portions being allowed to be easily brought into contact with the portion of the armrest portion where the heating element is installed, whereby the advantage of the third invention is increased further.

A fifth invention provides a seat with a heating device, characterized by including a heating element installed within at least an area which lies one third another side of the armrest portion from a front end thereof. By adopting this configuration, the advantage of the fourth invention is increased further.

A sixth invention provides a seat with a heating device, characterized in that reinforcement members are provided at respective connecting portions between the heating elements. By adopting this configuration, in the event that a tensile load or a bending load is generated in the heating element by the user placing his or her arm and hand on the armrest portion of the seat with the heating device, the bending load and the tensile load exerted on the heating element can be mitigated so as to increase the durability thereof, whereby the advantage of any of the first to fifth inventions is increased further.

A seventh invention provides a seat with a heating device, characterized in that the heating element is made up of an electric wire which generates heat. By adopting this configuration, the configuration and disposition of the heating element is facilitated, in the event that a tensile load or a bending load is generated in the heating element by the user placing his or her arm and hand on the armrest portion of the seat with the heating device, the bending load and the tensile load exerted on the heating wire of the heating element can be mitigated so as to increase the durability thereof, whereby the advantage of any of the first to sixth inventions is increased further.

An eighth invention provides a seat with a heating device, characterized by having a movable armrest portion and characterized in that a heating element is installed in at least a bottom side of the armrest portion. By adopting this configuration, even when the armrest portion is lifted, the arm, shoulder and back of the user can be warmed by the bottom side of the armrest portion where the heating element is installed being easily brought into contact with those bodily portions of the user.

A ninth invention provides a seat with a heating device, characterized by having a function to detect a position of the armrest portion and characterized in that the energization of the heating element installed in the bottom side is switched on or off depending upon the position of the armrest portion. By adopting this configuration, when the armrest portion is lowered, the energization of the heating element in the bottom side is stopped, whereas when the armrest portion is lifted, the energization of the heating element in the bottom side which is brought into contact with the user is implemented.

A tenth invention provides a seat with a heating device, characterized by including a heating element in at least a top side of the armrest portion in addition to the bottom side. By adopting this configuration, the user is allowed to be easily warmed whether the armrest portion is lowered or lifted, whereby the advantages or the eighth and ninth inventions can be increased.

An eleventh invention provides a seat with a heating device, characterized by having a function to switch the energization of the heating element between the bottom side and the top side of the movable armrest portion by detecting the position thereof. By adopting this configuration, with the armrest portion staying lifted, the heating element in the bottom side is energized, whereas with the armrest portion staying lowered, the heating element in the top side is energized, whereby effective heating is facilitated, thereby making it possible to increase the save-energy effect.

A twelfth invention provides a seat with a heating device, characterized in that the seat with the heating device is used in a rear seat of a motor vehicle. By adopting this configuration, the advantages provided by the eighth to eleventh inventions are increased.

Hereinafter, embodiments of the invention will be described by reference to the drawings. Note that the invention is not limited by the embodiments at all.

Embodiment 1

Hereinafter, an embodiment of the invention will be described by reference to the drawings.

Figure 2:
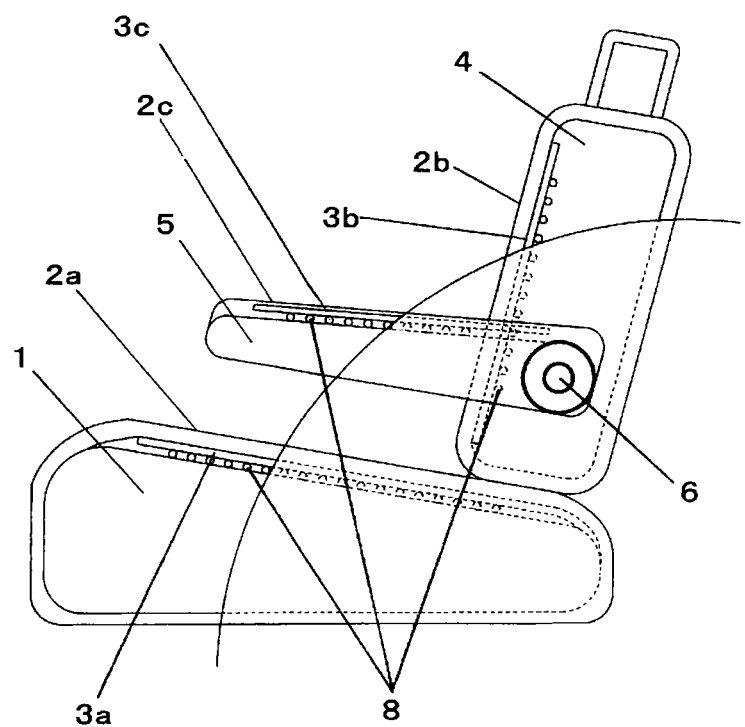
FIG. 2 is a side view of the seat with the heating device according to Embodiment 1 of the invention.
Figure 3:
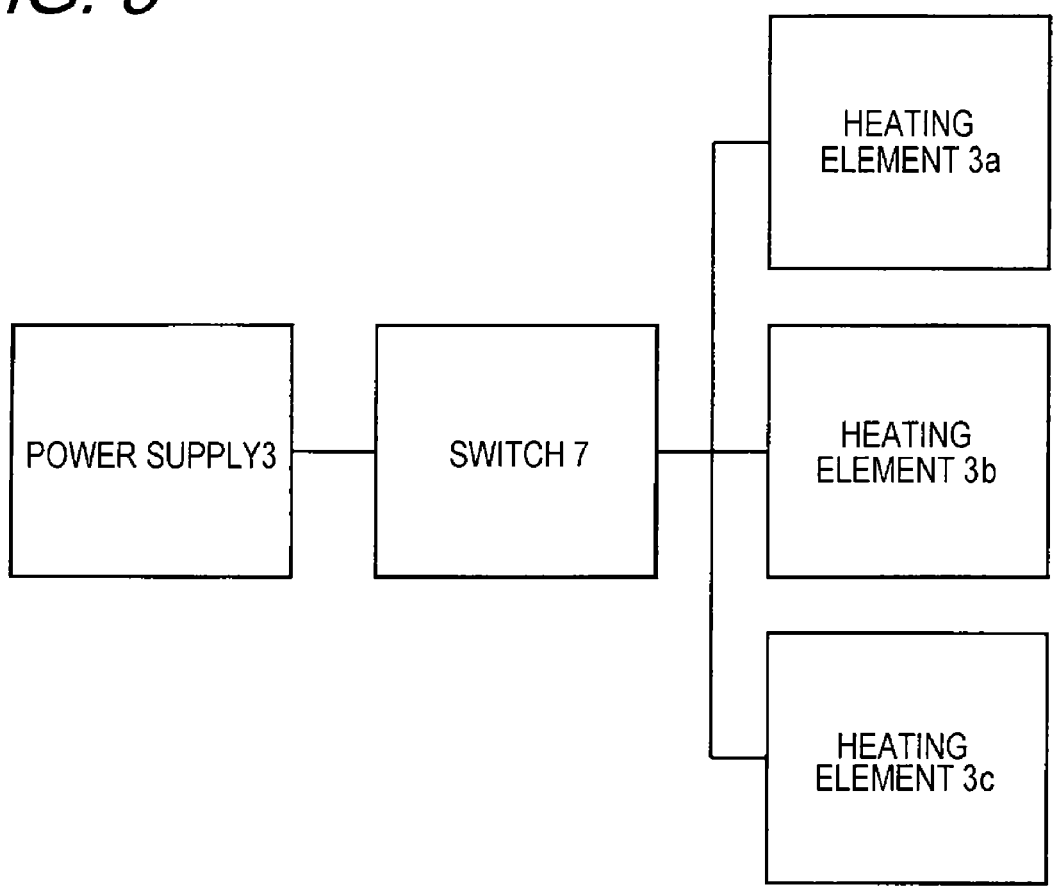
FIG. 3 is a block diagram showing an electrical connection made in the same seat with the heating device.

FIG. 1 is a perspective view showing a seat with a heating device according to a first embodiment of the invention, and FIG. 2 is a side view of the same seat. In addition, FIG. 3 is a block diagram showing an electrical connection made in the same seat.

In FIG. 1, reference numeral 1 denotes a seat portion on which a user sits, and its surface is covered with a skin material 2a of cloth or leather. In addition, a heating element 3a is installed in an interior of the seat portion under the skin material 2a and is connected to a power supply via electric wires (not shown). Reference numeral 4 denotes a backrest portion which faces the back of the user, and as with the seat portion 1, a surface of the backrest portion is covered with a skin material 2b which is made of cloth or leather. As with the seat portion 1, a heating element 3b is installed in an interior thereof and is connected to the power supply via electric wires (not shown). The heating elements 3a, 3b generate heat when energized, and heat so generated is conducted to the skin materials 2a, 2b, so as to warm the hip portion, thighs and back of the user.

In addition, reference numeral 5 denotes an armrest portion and is attached to the backrest portion 4 by a metal fixture 6. Similarly, a surface of the armrest portion 5 is covered with a skin material 2c made of cloth or leather. Additionally, a heating element 3c is installed in an interior thereof under the skin material 2c and is connected to the power supply by electric wires (not shown).

Further, these heating elements 3a, 3b, 3c are configured so as to be controlled to be ON/OFF by a switch 7 (not shown) which is made up of electric and electronic components.

In addition, in this embodiment, heating wires 8 are used as the heating elements 3a, 3b, 3c.

The function of the seat with the heating device will be described below which is configured as has been described heretofore.

When the user is seated in the seat and feels cold due to it being winter, he or she controls the switch 7 to heat his or her seat. By doing this, the heating elements 3a, 3b, 3c which are connected to the power supply via the electric wires are started to be energized. When the energization of the heating elements 3a, 3b, 3c is started, heat generated from the energized heating elements 3a, 3b, 3c is conducted to the skin materials 2a, 2b, 2c, whereby surfaces of the skin materials are warmed. When the user places his or her arm on the armrest portion 5, the arm is warmed via the skin material 2c and the user can feel comfortable.

In this embodiment, while the embodiment is described as the armrest portions 5 being attached to the backrest portion 4, the same advantage will be obtained even in the event that the armrest portions 5 are attached to the seat portion 1. In addition, in this embodiment, while the heating elements 3a, 3b, 3c are connected in parallel as is shown in FIG. 3, the same advantage will be obtained even in the event that the heating elements 3a, 3b, 3c are connected in series or through a combination of series and parallel connections.

In addition, by the heating wire 8c which makes up the heating element 3c of the seat 1 with the heating device of this embodiment being made to be made up of a braided wire which is made up, in turn, of a plurality of strands, the resistance to bending of the heating wire can be increased so as to increase the durability thereof.

Further, by applying a covering to a surface of the heating wire 8 which makes up the heating element 3c of the seat with the heating device of the embodiment, the resistance to wear of the heating wire can be increased so as to increase the durability thereof.

Embodiment 2

Figure 4:
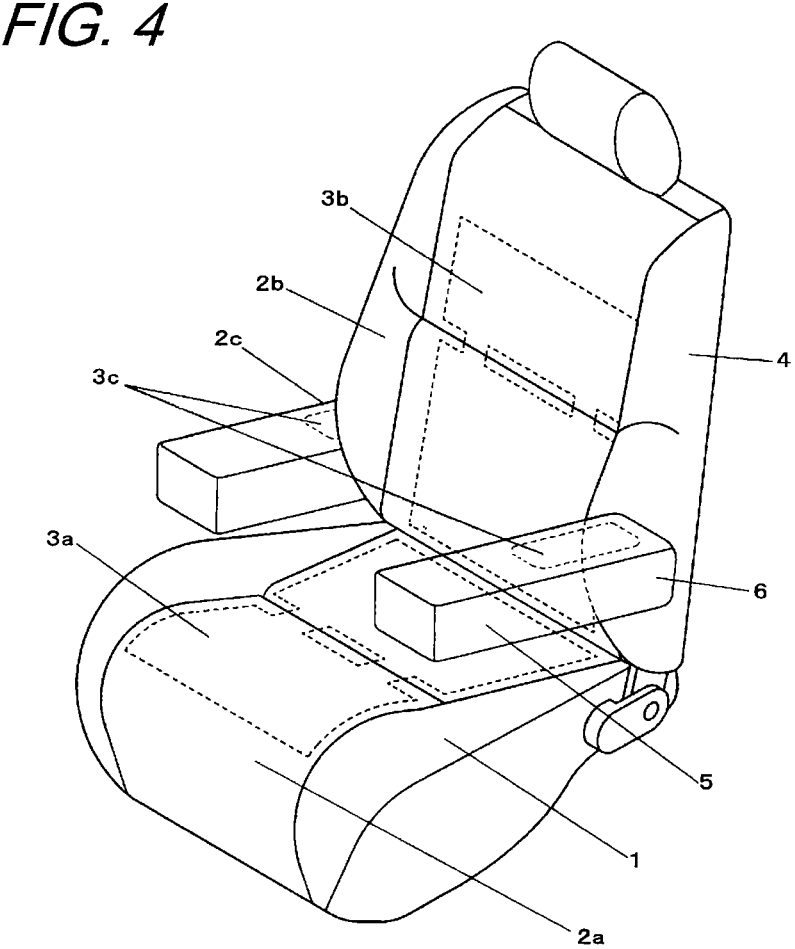
FIG. 4 is a perspective view of a seat with a heating device according to Embodiment 2 of the invention.

FIG. 4 is a perspective view of a seat with a heating device according to a second embodiment of the invention.

In FIG. 4, a heating element 3c is installed in an area extending over one half a top side 10 of an armrest portion 5 from a backrest portion side thereof. The other configurations of the seat with the heating device of the second embodiment remain the same as those of the embodiment 1 that has been described above.

The function of the heat with the heating device will be described blow which is configured as has been described above.

Normally, when the user uses the seat with the heating device, since his or her arm portion is brought into contact with the area extending over one half the top side 10 of the armrest portion 5 from the backrest side thereof, by configuring the armrest portion 5 so as to be heated mainly at the specific portion, similar sufficient comfortableness to that of the embodiment 1 can be obtained.

In addition, by a heating wire 8c which makes up the heating element 3c of the seat 1 with the heating device of this embodiment being made to be made up of a braided wire which is made up, in turn, of a plurality of strands, the resistance to bending of the heating wire can be increased so as to increase the durability thereof.

Further, by applying a covering to a surface of the heating wire 8 which makes up the heating element 3c of the seat with the heating device of the embodiment, the resistance to wear of the heating wire can be increased so as to increase the durability thereof.

Embodiment 3

Figure 5:
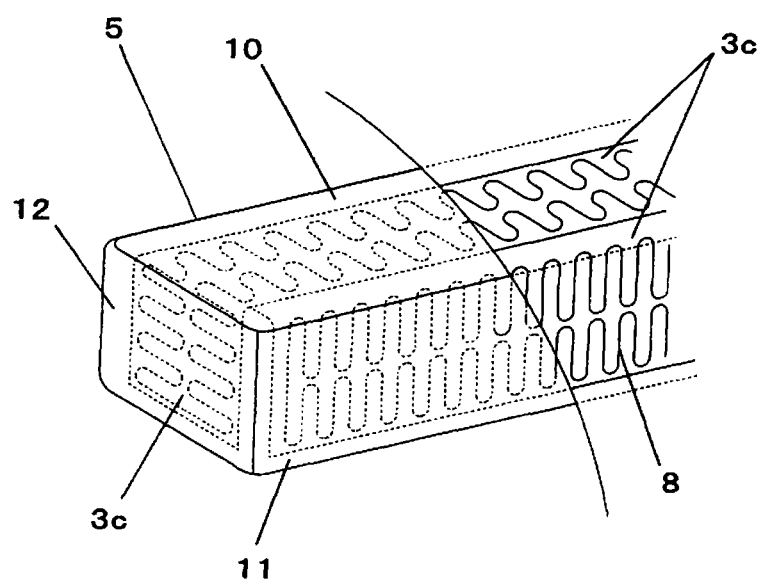
FIG. 5 is an enlarged view of an armrest portion of a seat with a heating device according to Embodiment 3 of the invention.

FIG. 5 is an enlarged perspective view of an armrest portion according to a third embodiment of the invention.

In FIG. 5, heating elements 3c are installed individually in a top side 10, an inner side 11 and a front end vertical side 12 of an armrest portion 5. The other configurations remain the same as those of the embodiments 1, 2 that have been described above.

The function of the seat with the heating device will be described below which is configured as has been described above.

It is easily imagined that the user grips on the front end of the armrest portion 5 when he or she uses the seat with the heating device. As this occurs, there is a possibility that the hand of the user extends to the top side 10, the inner side 11 and the front end vertical side 12 of the armrest portion 5. Even in such a case, the hand of the user is allowed to be easily brought into touch with the portions where the heating elements 3c are installed, whereby the user can feel warm in an ensured fashion, and this can eliminate a possibility that the user feels cold at his or her bodily portions to cause him or her to feel uncomfortable, thereby making it possible to obtain similar sufficient comfortableness to those obtained in the first to second embodiments.

In addition, by a heating wire 8c which makes up the heating element 3c of the seat 1 with the heating device of this embodiment being made to be made up of a braided wire which is made up, in turn, of a plurality of strands, the resistance to bending of the heating wire can be increased so as to increase the durability thereof.

Further, by applying a covering to a surface of the heating wire 8 which makes up the heating element 3c of the seat with the heating device of the embodiment, the resistance to wear of the heating wire can be increased so as to increase the durability thereof.

Embodiment 4

Figure 6:
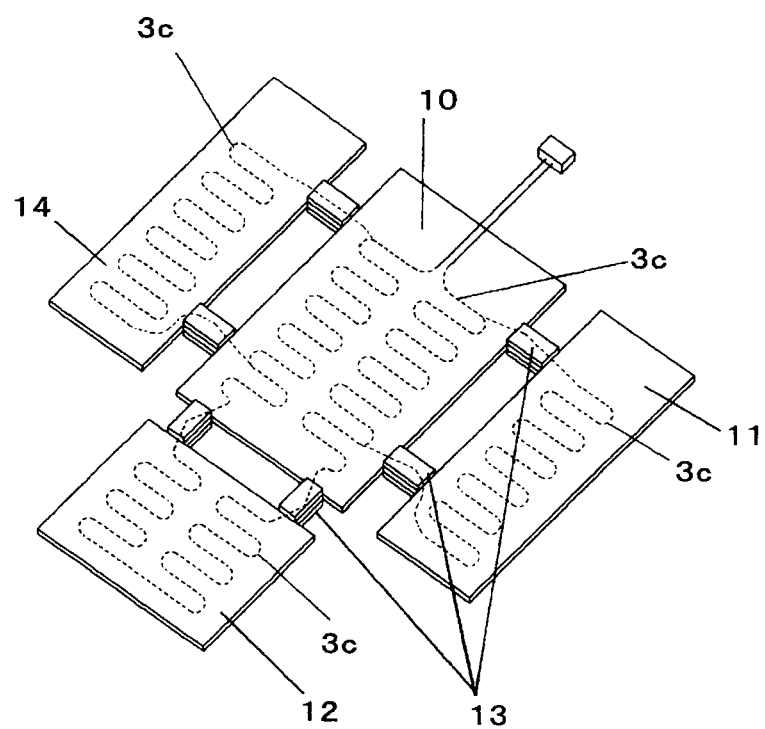
FIG. 6 is a development of heating elements according to Embodiment 4 of the invention.

FIG. 6 is a perspective view of heating elements 3c, which are deployed flat, of an armrest portion according to a fourth embodiment of the invention. As with the third embodiment, reinforcement materials 13 made of cloth or the like are attached to connecting portions between those heating elements 3c to reinforce the connections therebetween. In addition, the heating elements 3c are installed in areas of a top side 10, an inner side 11, a front end vertical side 12 and another side 14 of the armrest portion which lie one third of the armrest portion from a front end thereof. The other configurations remain the same as those of the first to third embodiments that have been described above.

The function of the seat with the heating device will be described below which is configured as has been described above.

It is easily imagined that the user grips on the front end of the armrest portion 5 when he or she uses the seat with the heating device. As this occurs, there is a possibility that the hand of the user extends to the top side 10, the inner side 11, the front end vertical side 12 and the other additional side 14 of the armrest portion 5. Even in such a case, the hand of the user is allowed to be easily brought into touch with the portions where the heating elements 3c are installed, whereby the user can feel warm in an ensured fashion, and this can eliminate a possibility that the user feels cold at his or her bodily portions to cause him or her to feel uncomfortable, thereby making it possible to obtain similar sufficient comfortableness to those obtained in the first to second embodiments.

In addition, by a heating wire 8c which makes up the heating element 3c of the seat 1 with the heating device of this embodiment being made to be made up of a braided wire which is made up, in turn, of a plurality of strands, the resistance to bending of the heating wire can be increased so as to increase the durability thereof.

Further, by applying a covering to a surface of the heating wire 8 which makes up the heating element 3c of the seat with the heating device of the embodiment, the resistance to wear of the heating wire can be increased so as to increase the durability thereof.

Embodiment 5

Hereinafter, a further embodiment of the invention will be described by reference to the drawings.

Figure 7:
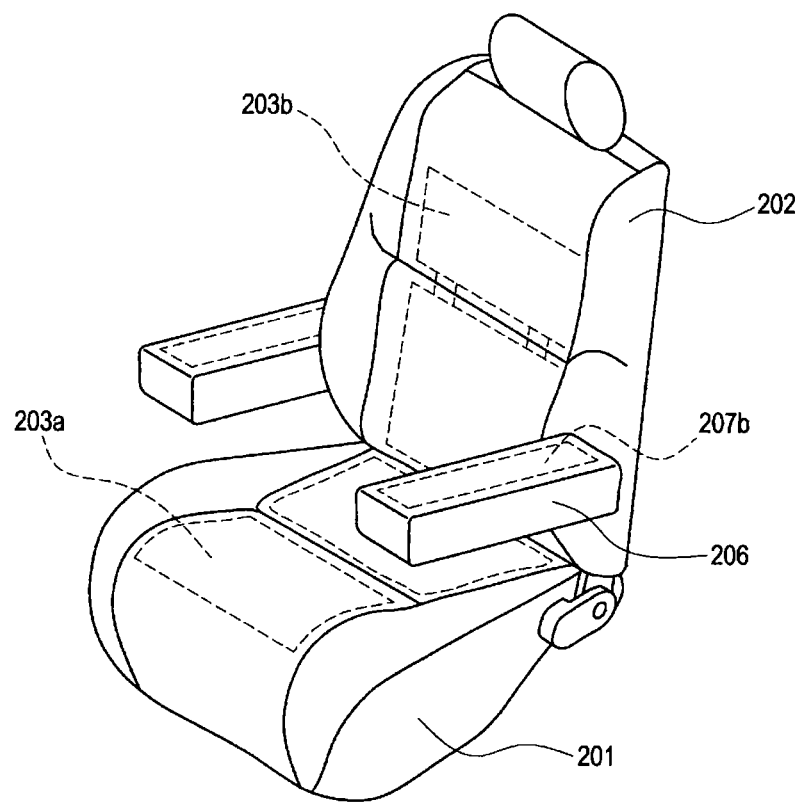
FIG. 7 is a perspective view of a seat with a heating device according to Embodiment 5 of the invention.
Figure 8:
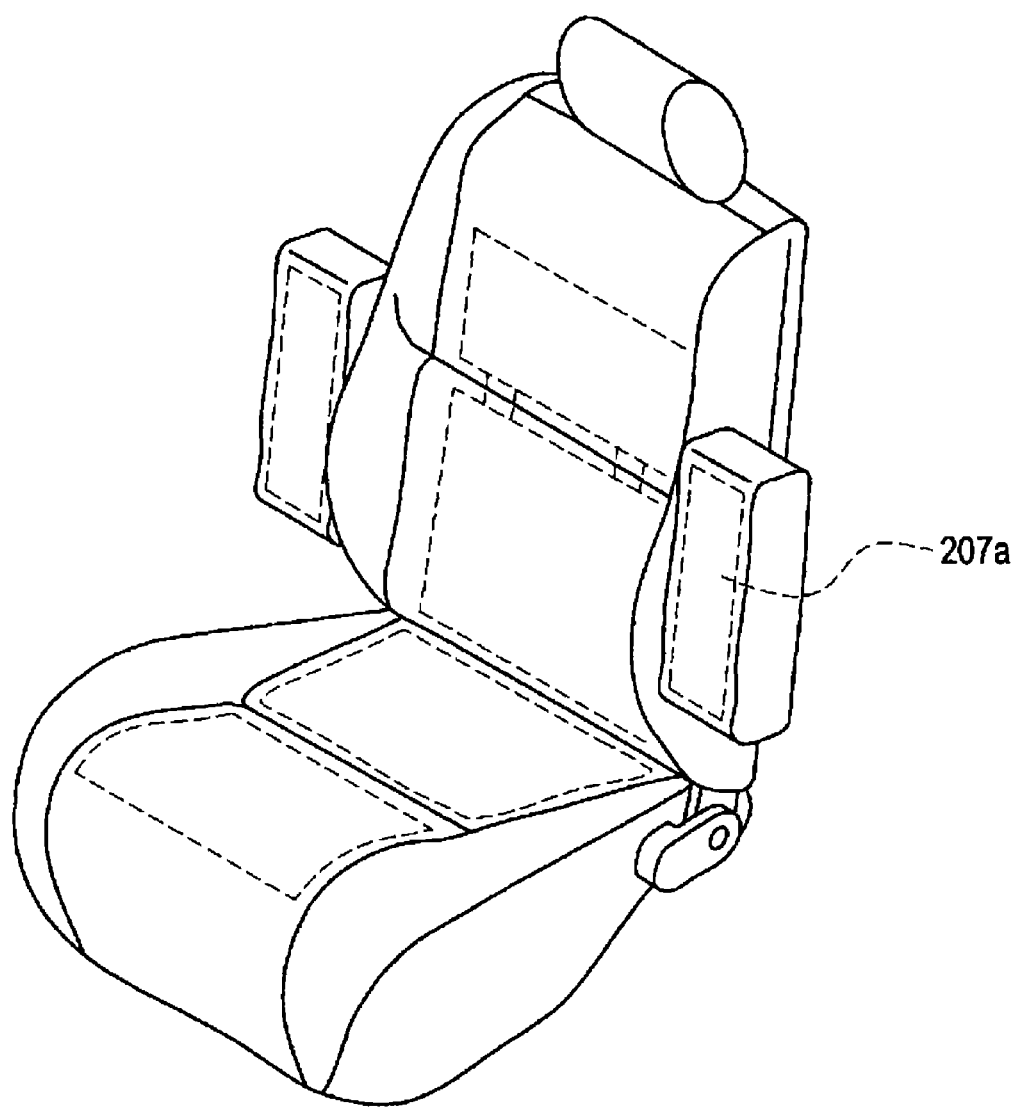
FIG. 8 is a perspective view of the seat with the heating device according to Embodiment 5 of the invention.

FIG. 7 is a perspective view showing a seat with a heating device according to a fifth embodiment of the invention, with armrest portions lowered. FIG. 8 is a perspective view showing the same seat with the armrest portions lifted. In addition, FIG. 9 is a circuit diagram showing an electrical connection according to the fifth embodiment.

Figure 9:
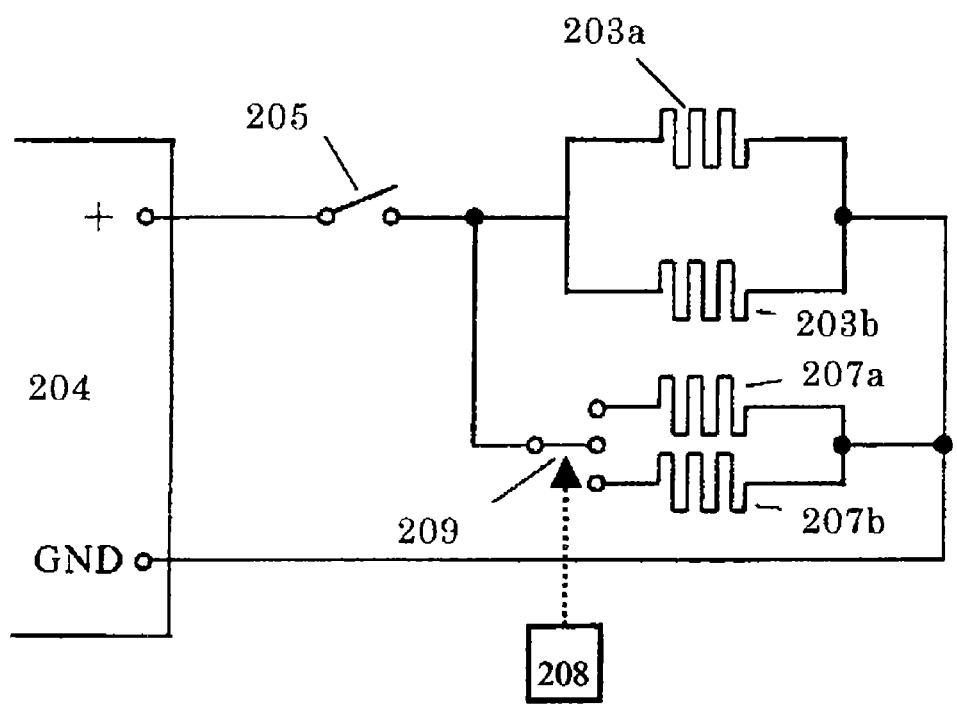
FIG. 9 is a circuit diagram showing an electrical connection made in Embodiment 5 of the invention.

In FIGS. 7, 8, 9, reference numeral 201 denotes a seat portion on which the user sits, and reference numeral 202 denotes a backrest portion which faces a back portion of the user. Surfaces of the seat portion and the backrest portion are covered with skin materials which are made of materials such as cloth or leather, and heating elements 203a, 203b are installed in respective interiors of the seat constituent portions under the skin materials. The heating elements 203a, 203b are connected to a power supply 204 by electric wires and are energized to generate heat by a switch 205 being switched on to thereby cause the heat so generated to be conducted through the skin materials to a hip portion, thigh portions and a back portion of the user to warm these bodily portions of the user. Reference numeral 206 denotes an armrest portion, and a surface thereof is also covered with a skin material. A heating element 207a is installed in a bottom side of the armrest portion, and a heating element 207b is installed in a top side thereof. A position detector 208 is mounted on a rotating shaft which connects the armrest portion 206 rotatably to the backrest portion 202 for detecting a position of the armrest portion 206 relative to the backrest portion 202. Reference numeral 209 denotes a switch which is switched on and off by the position detector 208.

The function of the seat with the heating device will be described below which is configured as has been described above.

When the heating elements 203a, 203b, which are connected to the power supply 204 via the electric wires, are started to be energized by the switch 205 being controlled by the user who intends to warm his or her seat, the surfaces of the skin materials of the seat portion and the backrest portion are warmed. As this occurs, in the case of the armrest portions 206 being lowered as is shown in FIG. 7, the position detector 208 detects that the armrest portion 206 is lowered, and the switch 209 is switched to start the energization of the heating element 207b. Then, when the user brings his or her arm and hand into contact with the armrest portion 206, the arm and hand are warmed, whereby the user can feel comfortable. In addition, in the case of the armrest portions 206 being lifted as is shown in FIG. 8, the position detector 208 detects that the armrest portion 206 is lifted, and the switch 29 is switched to start the energization of the heating element 207a. Then, when the user brings his or her arm, shoulder and back into contact with the armrest portion 206, the arm, shoulder and back are warmed, whereby the user can feel comfortable. As has been described above, the energization of the heating elements 207a, 207b installed in the armrest portion 206 is switched between the top side and the bottom side depending upon the position of the armrest portion 206, thereby making it possible to realize an effective save-energy heating for the user.

In this embodiment, the position detector 208 is mounted on the shaft which connects the armrest portion 206 to the backrest portion 202. Although the configuration of the position detector 208 is represented by a mechanical switch which switches the energization of the heating elements between the top and bottom sides at an arbitrary angle when the armrest portion 206 rotates or an angle meter for detecting an angle itself, the invention is not limited thereto. In addition, in the embodiment, while the position detector 208 and the switch 209 are described as being two components, they may be integrated into a single component which has the functions of the two components or may be made up of a combination of three or more components. For example, by the position detector 208 and the switch 209 being integrated into the single component, the configuration of the armrest portion which lies in proximity to the rotating shaft can be simplified so as to increase the durability of the armrest portion, and the armrest portion 206 can be fabricated at inexpensive costs. In addition, as to the angle of the armrest portion 206 at which the energization of the heating elements 207a, 207b is switched ON/OFF, a movable range of the armrest portion is divided into two halves which represent individually a state in which the armrest portion is lowered and a state in which the armrest portion is lifted, and the energization of the heating elements 207a, 207b is switched between the bottom side and the top side for the armrest portion lowered state and the armrest portion lifted state. By doing this, an appropriate heating can be implemented which matches the state in which the armrest portion is actually used. In addition, conservation of energy can be realized by stopping the energization of the heating element installed in the side of the armrest portion which is not being used. In addition, in the event that the movable range of the armrest portion is divided into three ranges, and in one of the three ranges where the armrest portion is inclined at an angle around 45 degrees, for example, at which the user finds it difficult to place his or her arm on the armrest portion or to bring his or her shoulder portion into contact therewith, no substantial heating of the user can be expected. Therefore, the energization of both the heating elements 207a, 207b installed in the bottom side and the top side, respectively, of the armrest portion is stopped, thereby making it possible to realize further conservation of energy. Note that the invention is not limited to the division of the movable range of the armrest portion into two or three ranges and angles at which the movable range is divided, and hence, the number and angle at which the movable range is to be divided can be set arbitrarily.

In addition, in the embodiment, while the heating elements are described as being installed only in the bottom side and the top side of the armrest portion 206, a configuration can be adopted in which a heating element is also installed in a lateral side of the armrest portion 206, and with the armrest portion lowered, the heating elements installed in the top side and the lateral side are energized, whereas with the armrest portion lifted, only the heating element installed in the bottom side is energized while the heating elements installed in the sides which are not brought into contact the body of the user are not energized. By selecting the side or sides where the heating element or heating elements are installed of the armrest portion which is or are brought into contact with the bodily portion or portions of the user at the time of using the seat with the heating device, a reduction in consumed power can be realized.

In addition, in the embodiment, while the armrest portions 206 are described as being attached to the backrest portion 202, the advantage still remains the same even in the event that the armrest portions 206 are attached to the seat portion 201. Further, in FIG. 9, while the heating elements 203a, 203b and the heating elements 207a, 207b are electrically connected in parallel so that the energization thereof can be switched ON/OFF by the switch 205, the way in which the uniting units are electrically connected is not limited thereto, and hence, a series connection may also be adopted in combination of the parallel connection.

In this embodiment, while a linear configuration which utilizes heating wires, a planar configuration which utilizes resistors having positive temperature properties and further a quasi-planar configuration which incorporates carbon fibers in a base material thereof can be used as the heating elements, the invention is not limited thereto.

Embodiment 6

Figure 10:
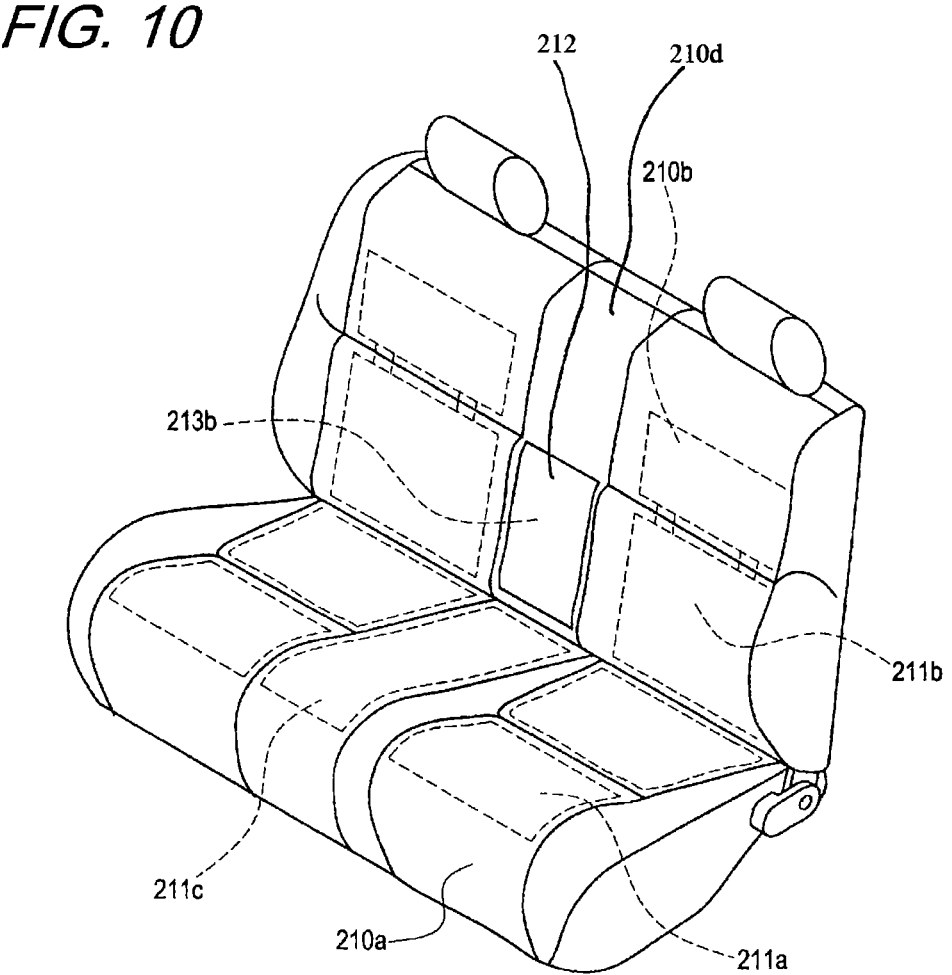
FIG. 10 is a perspective view of a seat with a heating device according to Embodiment 6 of the invention.
Figure 11:
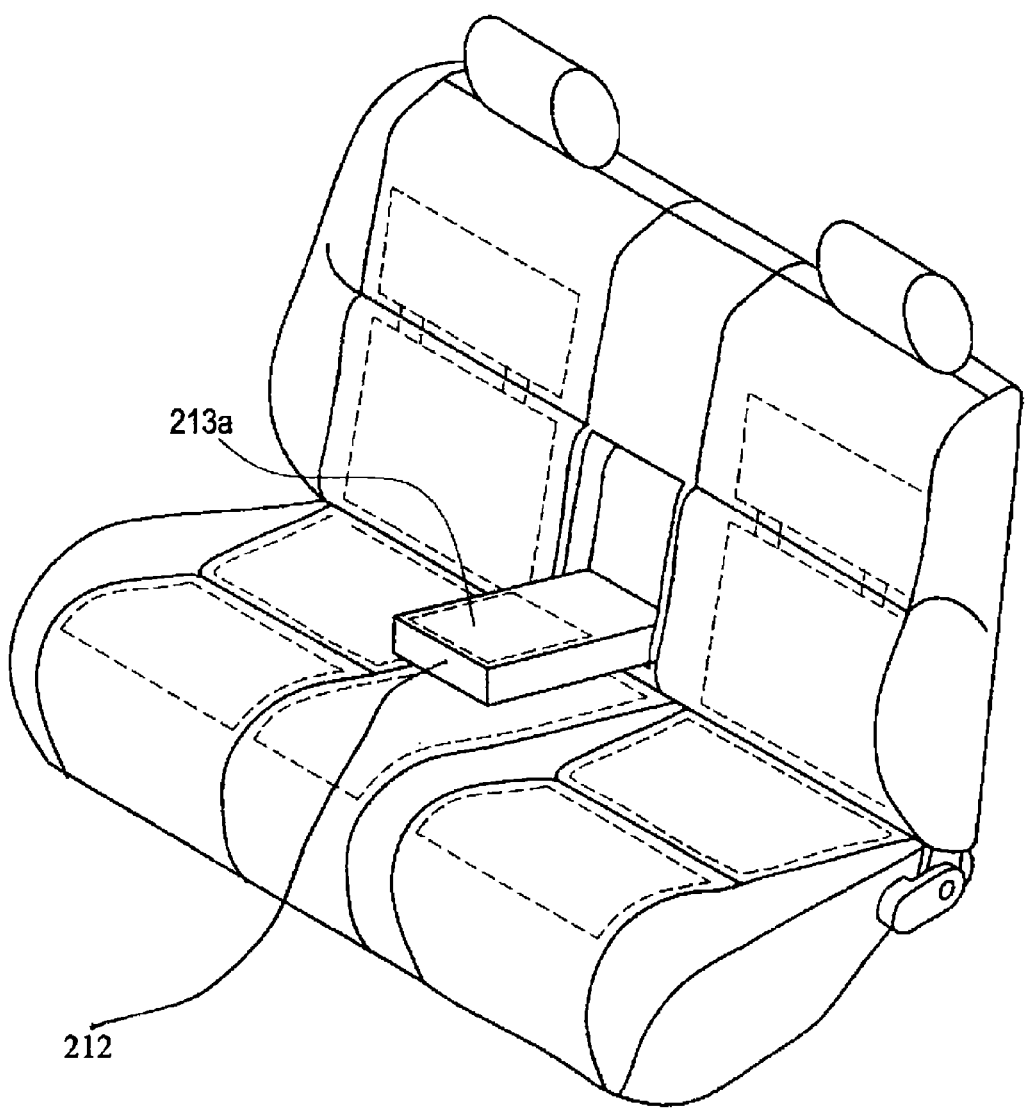
FIG. 11 is a perspective view of the seat with the heating device according to Embodiment 6 of the invention.
Figure 12:
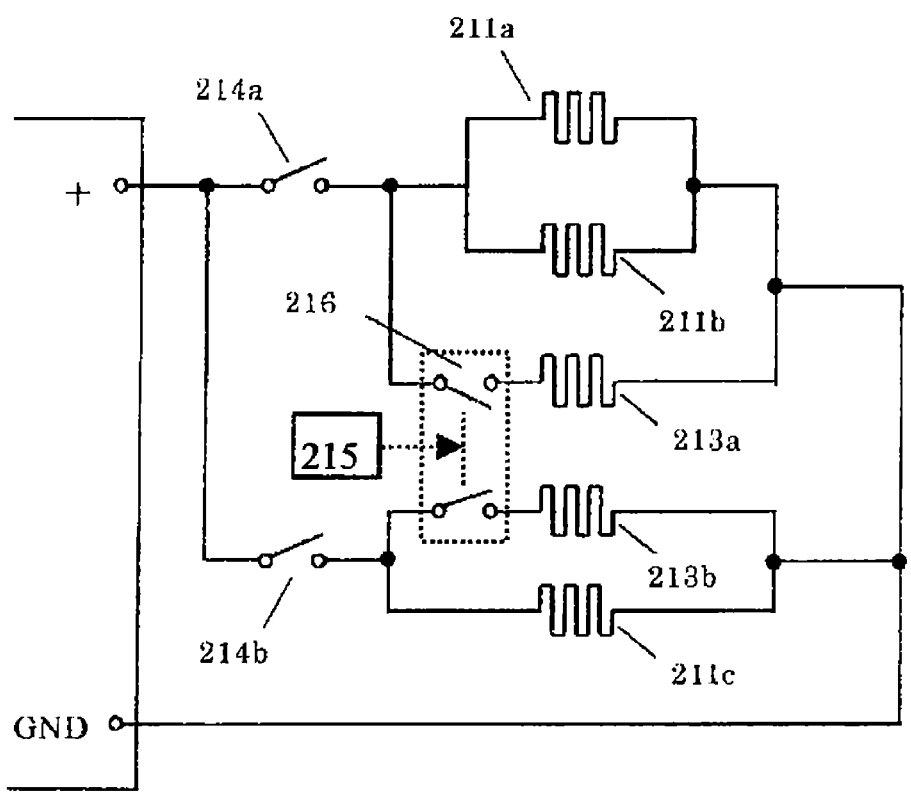
FIG. 12 is a circuit diagram showing an electrical connection made according to Embodiment 6 of the invention.
Figure 13:
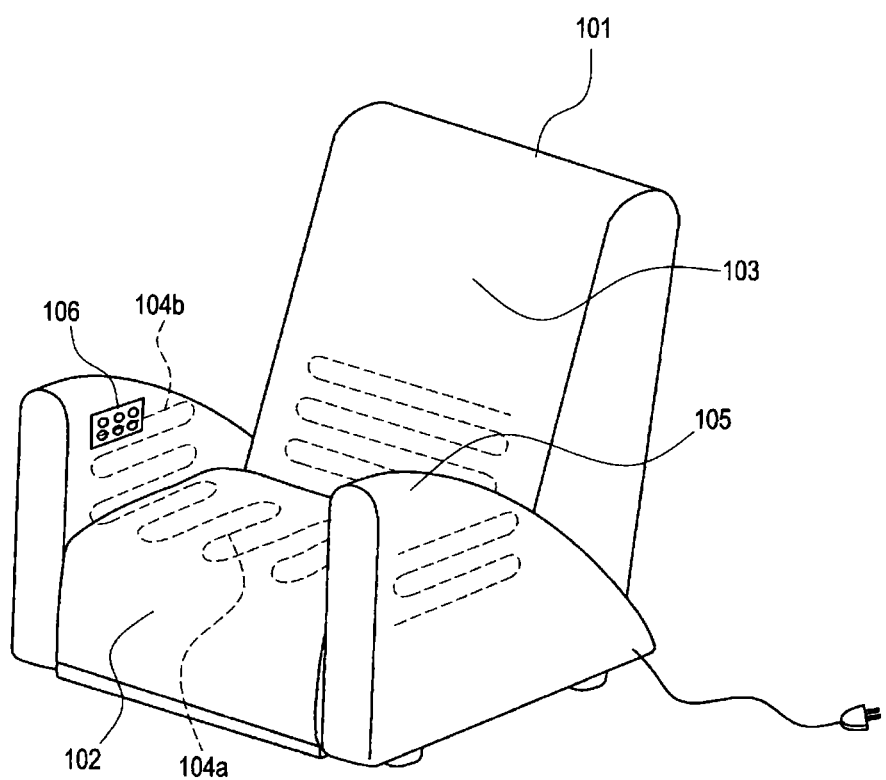
FIG. 13 is a perspective view of a conventional seat with a heating device.

FIG. 10 is a perspective view of an automotive rear seat according to a sixth embodiment of the invention with an armrest portion lifted. In addition, FIG. 11 is a perspective view of the automotive rear seat according to the sixth embodiment with the arm portion lowered. FIG. 12 is a circuit diagram showing an electrical connection made according to the sixth embodiment.

In FIGS. 10, 11, 12, reference numeral 210a denotes a left-side seat's seat portion, and reference numeral 210b denotes a left-side seat's backrest portion, and heating elements 211a, 211b are installed individually in interiors thereof under their skin materials. Reference numeral 210c denotes a central seat's seat portion, and a heating element 211c is installed in an interior thereof. In addition, reference numeral 210d denotes a central seat's backrest portion, and an armrest portion 212 is provided as part of the central seat's backrest portion 210d so as to be accommodated therein. In an interior of the armrest portion 212, a heating element 213b is installed in a side which constitutes a back supporting surface of the central seat's backrest portion 210d when the armrest portions 212 is accommodated, and a heating element 213a is installed in a side which constitutes a top side of the armrest portion 212 when it is used as an armrest. A switch 214a can switch ON/OFF the energization of the heating elements 211a, 211b, 213a, and a switch 214b can switch ON/OFF the energization of the heating element 211c, 213b. A position detector 215 is mounted on the armrest portion 212 for detecting the position of the armrest portion 212 relative to the seat surface, and a switch 216 is designed to be switched in accordance with positional information from the position detector 215.

The function of the seat with the heating device will be described below which is configured as has been described above.

When the user seated in the left-side seat controls the switch 214a to heat the seat, the heating elements 211a, 211b are energized, and surfaces of the left-side seat's seat portion 210a and the left-side seat's backrest portion 210b are heated. As this occurs, in the case of the armrest portion 212 being lowered, the switch 216 is switched on by the position detector 215 to energize the heating element 213a as well, whereby the top side of the armrest portion 212 can be heated.

On the other hand, in the case of the armrest portion 212 being accommodated in the central seat's backrest portion, the switch 216 is switched on by the position detector 215 to energize the heating element 213b. When the switch 214b is switched ON, the heating elements 211c, 231b are energized, whereby the central seat's seat portion 210c and the central seat's backrest portion 210d can be heated.

In the embodiment, while the left-side seat is taken for example to describe the invention, a right-side seat may be used for the same purpose. In addition, while the heating element 213a is described as being the single heating element, the heating element may be made up of a plurality of heating elements. For example, the heating element may be made up of a pair of heating elements which is designed to serve for the left- and right-side seats.

In addition, since there is no user who can be seated in the central seat when the armrest portion 212 is lowered to be used as the armrest, there is no point in energizing the heating element 211c for heating. Consequently, by adopting a configuration in which the heating element 211c is not energized even in the event that the switch 214b is ON with the armrest portion 212 lowered, wasteful utilization of electric power can be reduced.

This patent application is based on Japanese Patent Application No. 2007-328358 filed in Dec. 20, 2007 and Japanese Patent Application No. 2007-336252 filed in Dec. 27, 2007, the contents of which are to be incorporated herein by reference.

Thus, while the various embodiments of the invention have been described heretofore, the invention is not limited to the matters shown in the embodiments, and modifications and applications which will be made based on the description of the specification and known technologies by those skilled in the art to which the invention pertains are understood to fall within the scope of the invention and are hence understood to be incorporated in the scope of the invention to be protected.

INDUSTRIAL APPLICABILITY

Thus, as has been described heretofore, the seat with the heating device according to the invention is such as to realize comfortableness felt by the user when he or she is seated therein, reliability and durability thereof and hence can be applied to an application in which armrest portions are attached to a seat of a toilet with hot-water washing equipment on which a user sits, for example, thereby making it possible to provide a seat with a heating device which can realize an increase in comfortableness, as well as an increase in reliability and durability.

In addition, the seat with the heating device according to the invention is such as to realize an increase in comfortableness felt by the user when he or she is seated therein by allowing the arms and shoulders of the user to be warmed even in the case of the armrest portions being lifted and can be applied to an application in which armrest portions are attached to, for example, an automotive seat, a seat in a theater or a stadium, and a seat of a toile with hot-water washing equipment on which a user sits, thereby making it possible to provide a seat with a heating device which enables an increase in comfortableness and save-energy properties.

The invention claimed is:

1. A seat with a heating device comprising:
   a movable armrest portion;
   a first heating element installed in at least a bottom side of the armrest portion;
   a detector configured to detect a position of the armrest portion; and
   a switch configured to switch on or off the first heating element according to the position of the armrest portion.

2. The seat with a heating device as set forth in claim 1, further comprising a second heating element in a top side of the armrest portion.

3. The seat with a heating device as set forth in claim 2, further comprising a third heating element in a side of the armrest portion which faces a side of the body of a user.

4. The seat with a heating device as set forth in claim 3, further comprising a fourth heating element in a front end of the armrest portion.

5. The seat with a heating device as set forth in claim 4, further comprising reinforcement members provided at connecting portions connecting at least one of between the second and third heating elements and between the second and fourth heating elements.

6. The seat with a heating device as set forth in claim 2, wherein the second, third and fourth heating elements are extensive in one third of the armrest portion from a front end thereof.

7. The seat with a heating device as set forth in claim 2, wherein the second heating element is extensive in one half of the top side of the armrest portion proximal to a backrest side thereof.

8. The seat with a heating device as set forth in claim 1, wherein the heating element is made up of an electric wire which generates heat.

9. The seat with a heating device as set forth in claim 1, further comprising a second heating element in a top side of the armrest portion.

10. The seat with a heating device as set forth in claim 9, wherein the switch selectively turns on and off the first heating element in the bottom side of the armrest and the second heat element in the top side thereof.

11. The seat with a heating device as set forth in claim 1, wherein the seat with the heating device is used in a rear seat of a motor vehicle.

* * * * *